United States Patent
Chen et al.

(10) Patent No.: US 11,989,551 B2
(45) Date of Patent: May 21, 2024

(54) MODULAR FIRMWARE COMPOSITION

(71) Applicant: QUANTA COMPUTER INC., Taoyuan (TW)

(72) Inventors: Cheng-Han Chen, Taoyuan (TW); Yi-Chun Liao, Taoyuan (TW); Kuo-Chun Liao, Taoyuan (TW); Chong-Ren Guo, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 57 days.

(21) Appl. No.: 17/205,818

(22) Filed: Mar. 18, 2021

(65) Prior Publication Data

US 2022/0300276 A1 Sep. 22, 2022

(51) Int. Cl.
*G06F 8/71* (2018.01)
*G06F 8/65* (2018.01)
*G06F 9/4401* (2018.01)

(52) U.S. Cl.
CPC .............. *G06F 8/71* (2013.01); *G06F 8/65* (2013.01); *G06F 9/4401* (2013.01)

(58) Field of Classification Search
CPC ............. G06F 8/71; G06F 8/65; G06F 9/4401
See application file for complete search history.

(56) References Cited

U.S. PATENT DOCUMENTS

| | | | | |
|---|---|---|---|---|
| 6,381,693 B2 * | 4/2002 | Fish | ........................ | G06F 9/455 713/1 |
| 6,633,976 B1 * | 10/2003 | Stevens | ................. | G06F 9/4401 713/2 |
| 7,603,562 B2 * | 10/2009 | Flynn | .................... | G06F 21/575 713/180 |

(Continued)

FOREIGN PATENT DOCUMENTS

| | | |
|---|---|---|
| CN | 101114233 A | 1/2008 |
| TW | 200405209 A | 4/2004 |

(Continued)

OTHER PUBLICATIONS

TW Office Action for Application No. 110123673, dated Apr. 12, 2022, w/ First Office Action Summary.

(Continued)

*Primary Examiner* — Lewis A Bullock, Jr.
*Assistant Examiner* — Theodore E Hebert
(74) *Attorney, Agent, or Firm* — NIXON PEABODY LLP

(57) ABSTRACT

Boot firmware for a computing device can be modularly and dynamically composed to facilitate implementing changes and updates to a computing device's firmware. The firmware image can include a primary module, which is responsible for certain basic initializations, and a module list, which can include a listing of additional modules that are to be executed during the boot procedure. The module list can be used to identify and access the selected modules from a module library, such as via globally unique identifiers (GUIDs). Once acquired, the selected modules can be executed, taking into account required dependency modules (whether included in the selected modules or not) and configuration settings. The module library can be stored entirely locally (e.g., as part of a distributed firmware image), entirely remotely (e.g., accessible via network connection), or a mixture of locally and remotely.

18 Claims, 5 Drawing Sheets

(56) References Cited

U.S. PATENT DOCUMENTS

| | | | |
|---|---|---|---|
| 8,566,429 B2* | 10/2013 | Chung | G06F 8/65 709/201 |
| 10,331,434 B2* | 6/2019 | Tung | G06F 8/654 |
| 10,503,489 B1* | 12/2019 | Lin | G06F 9/442 |
| 2003/0154368 A1* | 8/2003 | Stevens, Jr. | G06F 9/4401 713/1 |
| 2008/0028385 A1* | 1/2008 | Brown | G06F 8/65 717/170 |
| 2014/0068585 A1* | 3/2014 | Young | G06F 21/572 717/168 |
| 2018/0253555 A1* | 9/2018 | Schumacher | G06F 9/4401 |

FOREIGN PATENT DOCUMENTS

| | | |
|---|---|---|
| TW | 200813834 A | 3/2008 |
| TW | 202004496 A | 1/2020 |
| TW | 202034176 A | 9/2020 |

OTHER PUBLICATIONS

TW Search Report for Application No. 110123673, dated Apr. 12, 2022, w/ First Office Action.

* cited by examiner

MODULAR FIRMWARE COMPOSITION

TECHNICAL FIELD

The present disclosure relates to computing devices generally, and more specifically to firmware used to enable operation of computing devices.

BACKGROUND

In modern computing devices (e.g., personal computers, servers, and others), firmware can be used for various purposes. Boot firmware, such as BIOS (Basic Input/Output System) and/or UEFI (Unified Extensible Firmware Interface), handles various initialization processes when a computing device is booting up, such as initializing and facilitating communication with hardware of the computing device and initializing the operating system. The firmware is generally stored and fixed in a memory (e.g., SPI ROM (Serial Peripheral Interface Read Only Memory)) during manufacture.

If an end user wishes to make changes to the firmware, such as to debug issues, improve performance, make customizations, or add new features, the user would need to request such changes from a developer, such as an Original Equipment Manufacturer (OEM) or an Original Design Manufacturer (ODM). Once requested, the OEM or ODM would then make the requested modifications to the firmware and rebuild the firmware image. This new firmware image would then need to be installed into the computing device, whether by the OEM, ODM, or end user. Additional steps, such as verification/testing of the new firmware image and rebooting of the computing device may also be needed. This entire process can be costly and time-consuming. Additionally, the time and monetary investment required to incorporate the new firmware image may be approximately the same, regardless of the type or extent of change requested. Thus, even small changes to the firmware code may end of up requiring significant time and expense.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, supplemented by this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present disclosure include a computer-implemented method comprising accessing a firmware image from local storage of a computing device. The firmware image includes a primary module and a module list. The method further comprises executing the primary module, which includes initializing one or more hardware resources of the computing device. The method further comprises accessing the module list associated with the firmware image. The module list includes unique identification information associated with a selected set of modules of a module library. The module library includes a plurality of executable modules. The method further comprises composing a firmware bundle based on the selected set of modules. Composing the firmware bundle includes accessing each module of the selected set of modules. The method further comprises executing the firmware bundle.

In some cases, composing the firmware bundle further includes accessing dependency information associated at least one module of the selected set of modules. Composing the firmware bundle further includes identifying an additional module using the dependency information. In some cases, the additional module is not included in the selected set of modules, in which case composing the firmware bundle further includes adding the additional module to the firmware bundle. In some cases, the dependency information identifies a parent module and a child module. In such cases, composing the firmware bundle further includes generating a module sequence using the dependency information. Generating the module sequence includes positioning the parent module before the child module in the module sequence. In such cases, executing the firmware bundle includes executing the firmware bundle based on the module sequence.

In some cases, the module library is stored in the firmware image. In some cases, at least some of the module library is stored in a remote storage that is accessible via a network interface. In such cases, accessing each module of the selected set of modules includes accessing at least one module of the selected set of modules from the remote storage via the network interface.

In some cases, the computing device includes a main processor and an independent processor. In such cases, executing the primary module, accessing the module list, and composing the firmware bundle are performed by the independent processor; and executing the firmware bundle is performed by the main processor. In some cases, composing the firmware bundle further includes copying each module of the selected set of modules into system memory accessible by the main processor. In such cases, executing the firmware bundle includes accessing the firmware bundle from the system memory. In some cases, the method further comprises accessing configuration parameters from the firmware image and storing the configuration parameters in the system memory. The method further comprises storing, in system memory, a module sequence that is indicative of an order for executing the modules of the firmware bundle. In such cases, executing the firmware bundle further includes executing each module of the firmware bundle in the order indicated by the module sequence. Executing each module of the firmware bundle includes applying the configuration parameters.

In some cases, the method further comprises accessing configuration parameters associated with the module list, wherein executing the firmware bundle includes applying the configuration parameters. In some cases, the method further comprises initializing an operating system after executing the firmware bundle. In some cases, the method further comprises updating the module list to generate an updated module list having an updated selected set of modules. The updated selected set of modules is different from the selected set of modules. In such cases, the method further comprises restarting the computing device and composing an updated firmware bundle based on the updated selected set of modules. The method then further comprises executing the updated firmware bundle. In some cases, the computing device includes the one or more hardware resources and one or more additional hardware resources.

Executing the firmware bundle includes initializing the one or more additional hardware resources.

Embodiments of the present disclosure include a computer-program product tangibly embodied in a non-transitory machine-readable storage medium, including instructions configured to cause one or more data processing apparatuses to perform any of the methods described above.

Embodiments of the present disclosure include a computing device. The computing device comprises a first hardware device, a second hardware device, and one or more processors. The computing device further comprises a non-transitory computer-readable storage medium containing instructions which, when executed on the one or more processors, cause the one or more processors to perform operations. The operations include accessing a firmware image having a primary module and a module list. The operations further include executing the primary module, which includes initializing the first hardware device. The operations further include accessing the module list associated with the firmware image. The module list includes unique identification information associated with a selected set of modules of a module library. The module library includes a plurality of executable modules. The operations further include composing a firmware bundle based on the selected set of modules. Composing the firmware bundle includes accessing each module of the selected set of modules. The operations further include executing the firmware bundle, which includes initializing the second hardware device.

In some cases, composing the firmware bundle further includes accessing dependency information associated at least one module of the selected set of modules. Composing the firmware bundle further includes identifying an additional module using the dependency information. In some cases, the additional module is not included in the selected set of modules, in which case composing the firmware bundle further includes adding the additional module to the firmware bundle. In some cases, the dependency information identifies a parent module and a child module. In such cases, composing the firmware bundle further includes generating a module sequence using the dependency information. Generating the module sequence includes positioning the parent module before the child module in the module sequence. In such cases, executing the firmware bundle includes executing the firmware bundle based on the module sequence.

In some cases, the firmware image is stored in the non-transitory computer-readable storage medium. In some cases, at least some of the module library is stored in a remote storage that is accessible via a network interface. In such cases, the computing device further comprises a network interface. Accessing each module of the selected set of modules includes accessing at least one module of the selected set of modules from the remote storage via the network interface.

In some cases, the one or more processors includes a main processor and an independent processor. Executing the primary module, accessing the module list, and composing the firmware bundle are performed by the independent processor; and executing the firmware bundle is performed by the main processor. In some cases, composing the firmware bundle further includes copying each module of the selected set of modules into system memory accessible by the main processor. Executing the firmware bundle includes accessing the firmware bundle from the system memory. In some cases, the operations further comprise accessing configuration parameters from the firmware image and storing the configuration parameters in the system memory. The operations further include storing a module sequence in the system memory. The module sequence is indicative of an order for executing the modules of the firmware bundle. In such cases, executing the firmware bundle further includes executing each module of the firmware bundle in the order indicated by the module sequence. Executing each module of the firmware bundle includes applying the configuration parameters.

Additional features and advantages of the disclosure will be set forth in the description that follows, and will in part, be obvious from the description; or can be learned by the practice of the principles set forth herein. The features and advantages of the disclosure can be realized and obtained by means of the instruments and combinations particularly pointed out in the appended claims. These and other features of the disclosure will become fully apparent from the following description and appended claims, or can be learned by the practice of the principles set forth herein.

BRIEF DESCRIPTION OF THE DRAWINGS

The specification makes reference to the following appended figures, in which use of like reference numerals in different figures is intended to illustrate like or analogous components.

Figure 1:
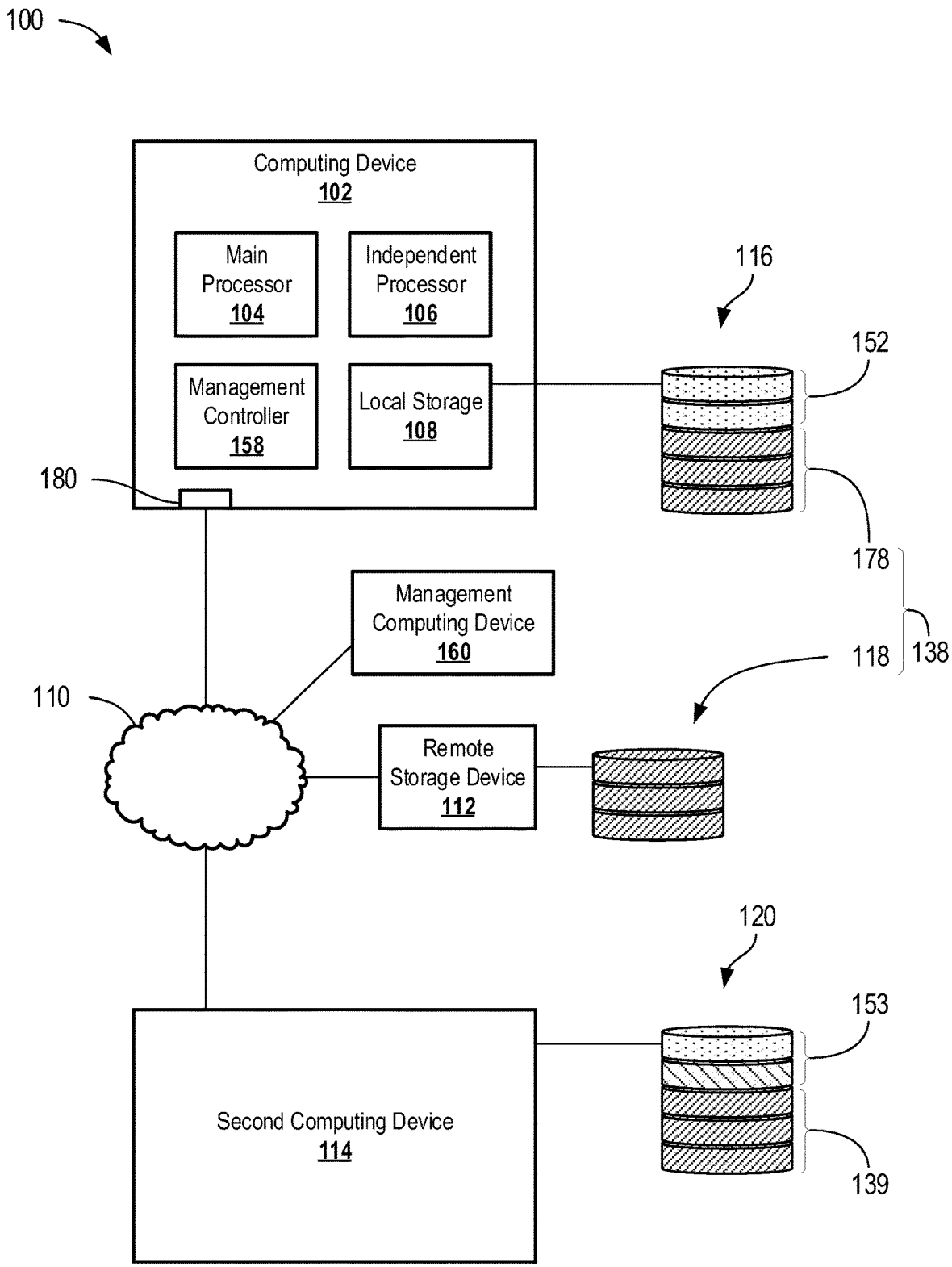
FIG. 1 is a schematic diagram depicting a computing environment implementing modular firmware composition, according to certain aspects of the present disclosure.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION

Certain aspects and features of the present disclosure relate to boot firmware for a computing device that can be modularly and dynamically composed to facilitate implementing changes and updates to a computing device's firmware. The firmware image can include a primary module, which is responsible for certain basic initializations, and a module list, which can include a listing of additional modules that are to be executed during the boot procedure. The module list can be used to identify and access the selected modules from a module library, such as via globally unique identifiers (GUIDs). Once acquired, the selected modules can be executed, taking into account required dependency modules (whether included in the selected modules or not) and configuration settings. The module library can be stored entirely locally (e.g., as part of a distributed firmware image), entirely remotely (e.g., accessible via network connection), or a mixture of locally and remotely.

Certain aspects and features of the present disclosure can be used with any suitable computing device that uses firmware during a boot process, such as a personal computer (e.g., laptop, desktop, or the like), a portable computing device (e.g., a tablet, a smartphone, or the like), or a computer server (e.g., a rackmount server or blade server). The boot process can start after power is supplied to the computing device or following a restart. During the boot process, boot firmware is executed. Traditional boot firmware is often BIOS and/or UEFI firmware, although the present disclosure is not limited to any particular structure style of firmware.

According to certain aspects of the present disclosure, the modular firmware image can include at least a primary module and a secondary module. The primary module includes platform-dependent (e.g., chipset-dependent) basic essential code used to initialize certain hardware resources necessary to access the secondary module and subsequent add-on modules. For example, the primary module may include code used to enable reading from a storage device in which the add-on modules are stored. The secondary module includes a module list and, optionally, configuration parameters. The module list is a listing of all modules that are to be used during the boot process. In some cases, the module list can be known as a module recipe or a firmware recipe. The secondary module can be stored in non-volatile random access memory (NVRAM), permitting the module list to be modified as needed, such as via a management interface or application programming interface (API). Modification of the module list can allow an individual to modify the firmware that is ultimately executed on the computing device during boot-up. The configuration parameters can include global parameters or module-specific parameters that can be passed to any of the add-on modules when they are executed.

In some cases, users (e.g., end users, distributors, manufacturers, developers, and others making use of the computing device) can modify module lists according to system requirements without needing the entire firmware to be reprogrammed and the firmware image to be rebuilt. For example, a manufacturer can implement the same firmware image across a large number of different products, while solely adjusting the primary module and/or secondary module for the individual needs of each different product. In such an example, a low-end personal computer and a high-end personal computer may share the same firmware image containing the same module library, but with different secondary modules. Thus, the secondary module of the low-end personal computer may include a module list specific to the hardware and features of the low-end personal computer, causing the low-end personal computer to boot using only those modules on its module list. Likewise, the secondary module of the high-end personal computer may include a module list specific to the hardware and features of the high-end personal computer, causing the high-end personal computer to boot using only those modules on its module list. To implement a third product (e.g., a mid-range personal computer), the manufacturer can re-use the same firmware image, altering only the secondary module for that particular product. In some cases, the module library can be stored locally (e.g., on SPI ROM), such as in the firmware image that is distributed to the computing device. In other cases, some or all of the module library can be located on a remote storage device, such as a networked server. As used herein, module libraries that are stored and accessed locally can be referred to as in-band module libraries, whereas module libraries that are stored and accessed remotely, such as via a network interface, can be referred to as out-of-band module libraries. In some cases, in-band module libraries can nevertheless be updated via a network interface (e.g., via a network interface of a baseboard management controller (BMC)).

Further, if there is a need or desire to make updates to individual modules of the firmware, certain aspects of the present disclosure permit doing so with ease. In some cases, new firmware images can be generated and distributed to all computing devices, with each computing device merely retaining its primary module and/or secondary module, or with a new primary module and/or secondary module. In other cases, modules of a module library can be individually updated and distributed, including any related modules based on dependencies (e.g., if the updated module is now dependent on a new or updated parent module, that parent module can also be updated; likewise, in some cases the updated module may require child modules that depend on the updated module to also be updated, in which case the child modules can also be updated). In some cases, entire module libraries or portions of module libraries (e.g., some or all of a module library stored on a remote storage device) can be updated.

As used herein, the term firmware image can refer to a single file (e.g., a binary file) or multiple files. For example, in some cases, a firmware image can include a primary module, a secondary module, and a module library in a single file. In other cases, however, the firmware image including the primary module, the secondary module, and the module library can be split into multiple files (e.g., a first file containing the primary module, a second file containing the secondary module, and a third file containing the module library). In some cases, the term firmware image can refer to a single file or multiple files located in contiguous memory space.

According to certain aspects of the present disclosure, a computing system can boot up using a main processor. The term main processor, as used herein, can include any processing device usable to read and execute the boot firmware code, such as a purpose-built boot processor, a central processing unit (CPU) of the computing device, or a core of the central processing unit. In some cases, the boot-up process can also make use of an additional independent processor. As used herein, the term independent processor is intended to indicate that the independent processor is tasked with performing certain boot-up functions that are not performed by the main processor. The independent processor can be isolated from the main processor such that code and data loaded within the independent processor is not directly accessible by the main processor during execution. An independent processor can be any suitable processor, such as an external microcontroller or a core inside the central processing unit (e.g., a platform security processor (PSP), such as a platform security processor implemented through a trusted execution environment). Such an independent processor (e.g., a PSP) can be an isolated security processor that runs independently from the main cores of the computing device. Such an independent processor can be responsible for providing hardware root of trust, training memory, copying BIOS into DRAM (dynamic random access memory), and releasing control to cores (e.g., x86 cores).

When only a main processor is used during a boot-up process, the primary module can be executed to initialize various hardware resources, and the secondary module can then be accessed to identify the module list and any configuration parameters present. The main processor will then proceed to compose a firmware bundle containing each selected module in the module list, and then execute the firmware bundle. In some cases, composing a firmware bundle merely includes identifying which modules are to be executed, such as by including the selected modules from the module list and any additional dependent modules that may be necessary to execute any of the selected modules. In some cases, composing the firmware bundle includes generating a module sequence, or order in which the modules are to be executed. The processor can then execute the firmware bundle by accessing the module library and executing each of the designated modules. In some cases, the processor executes the module directly from the module library, although that need not always be the case. In some cases, composing the firmware bundle includes copying the designated modules to a storage location and then executing the modules from the storage location. Once execution of all designated modules is complete, the processor can initialize and/or hand over control to an operating system.

According to certain aspects of the present disclosure, when an independent processor is used alongside a main processor to boot-up a computer, the independent processor can be tasked with identifying the selected modules from the module list of the secondary module, then copying the selected modules to a storage accessible by the main processor (e.g., system memory). In some cases, the independent processor can execute the primary module and then access the secondary module. In other cases, the independent processor may merely copy the selected modules to the system memory, leaving the main processor to execute the primary module and then the copied selected modules.

In an example, when a boot-up process begins, an independent processor may initialize system memory; check the system requirements from a storage component (e.g., the module list); load and access the module library (e.g., locally and/or remotely); copy selected modules to the system memory based on the system requirements (e.g., module list), including dependent modules as needed; optionally store additional memory settings and/or a module sequence to a table; and release control to the main processor. Once control is released to the main processor, the main processor can optionally execute the primary module; optionally load the memory settings and/or the module sequence from the table; and execute the copied modules, optionally using the module sequence.

In some cases, the module list is a list of GUIDs for selected modules that are to be executed during a boot-up process, although that need not always be the case. In some cases, the module list can include additional information, such as one or more notes (e.g., notes indicating the name or purpose of the module associated with a particular GUID). The module list can be user-updatable. In some cases, the module list can be present in a particular order or can include sequence information, although this need not always be the case. In some cases, a module sequence is automatically generated based on the module attributes of each selected module.

In some cases, the module list can include an alternate module GUID associated with a particular module GUID. For example, the module list may include a module GUID for "Module A" and, associated with that module GUID, an alternate module GUID for "Module A1." In such cases, the Module A1 may be an alternate or new version of Module A, which is to be used if available. The processor can search for Module A1 in the module library, and if found, proceed using that module. However, if Module A1 is not found in the module library, the processor can fall back to using Module A.

In some cases, a module list can take the form of or be interpreted as a collection of records (e.g., rows of a table). Each record can represent a segment of code to be executed. In some cases, a record can contain a single module GUID, in which case that record indicates that the given module GUID is to be used. In some cases, a record can contain a base module GUID as well as one or more alternate module GUIDs for that base module GUID. Therefore, as used herein, the phrase "each module of the selected set of modules" and similar phrases can be inclusive of, as appropriate, i) all modules identified anywhere in the selected set of modules; or ii) one module for each record of a module list. Thus, execution of "each module of the selected set of modules" for a module list containing only Module A and an alternate Module A1 may refer to execution of only Module A1, or if Module A1 is not available, only Module A.

In some cases, the module list in the secondary module is stored locally, such as SPI ROM or in memory of a BMC of the computing device, although that need not always be the case. In some cases, the module list can be stored in a remote storage that is accessible via a network interface. In some cases, a management interface (e.g., a BMC WebUI or UART (universal asynchronous receiver/transmitter) console) may be used to provide for management of the module list and/or configuration parameters.

Each module can include attribute information. The attribute information can be in the form of a table, although that need not always be the case. The attribute information can include the module's GUID, the module's version information, and dependency information. The dependency information can include any parent module dependencies (e.g., modules that must be executed prior to execution of the given module) and/or any child module dependencies (e.g., required child modules that must be executed after execution of the given module, or optional child modules that require execution of the given module prior to execution of the child module). Other information can also be included in the attribute information, such as module location (e.g., location in memory), module size, required variables or parameters, and optional variables or parameters.

When the module library is being accessed and/or when the firmware bundle is being composed, the attribute information can be accessed for each selected module from the module list. The attribute information can be used to ensure the correct module is being selected; to identify any additional modules, not included in the module list, that are to be executed; and to generate a module sequence that ensures parent dependent modules are executed before their child modules.

For example, if a graphics processing unit (GPU) module to initialize a GPU card is included in the module list, that GPU module may include dependency information indicating that a memory module used to raise the memory address space is to be executed first. If that memory module is not already in the module list, it will be included in the firmware bundle to be executed. Using the dependency information, a module sequence can be generated that includes the memory module before the GPU module. In some cases, parent dependent modules may themselves require further parent dependent modules.

In some cases, a management interface (e.g., a BMC WebUI, a UART (universal asynchronous receiver/transmitter) console, or any other suitable interface) may be used to check attributes (e.g., dependency attributes) of a given module in the module library. In some cases, if a management interface is used to provide or modify a module list (e.g., in the secondary module), the management interface can automatically check attributes of the selected modules and add in any necessary dependent modules. In some cases, the management interface can further automatically arrange the module list into a module sequence to ensure parent dependency modules are executed before their child dependency modules. In some cases, the management interface can save commonly used module lists and/or configuration settings, permitting a user to deploy the commonly used module lists and/or configuration settings across multiple computing devices.

The present disclosure can be embodied in many different forms. Representative embodiments are shown in the drawings, and will herein be described in detail. These embodiments are examples or illustrations of the principles of the disclosure but are not intended to limit its broad aspects. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a schematic diagram depicting a computing environment 100 implementing a modular firmware composition, according to certain aspects of the present disclosure. The computing device 102 can be any suitable computing device, such as a personal computer, a server, or other. The computing device 102 can include a main processor 104 and optionally an independent processor 106. The main processor 104 can be any suitable processor, such as a CPU or one or more cores of a CPU. Independent processor 106, when used, can be a microcontroller (e.g., a purpose-built microcontroller), a separate processor from the CPU, or a core of the CPU, such as a secure core, such as a platform security processor implemented through a trusted execution environment. The computing device 102 can optionally include a management controller 158, such as a baseboard management controller (BMC). The computing device 102 can include local storage 108 across one or more storage devices, such as read only memory, random access memory, and the like. The computing device 102 can include additional elements, such as various additional hardware components, busses, peripherals, and the like.

When the computing device 102 is booted up, it can execute certain firmware modules from a firmware package 116 stored in the local storage 108 of the computing device 102. The firmware package 116 includes platform-specific firmware 152 that is specific to the computing device 102 itself or specific to certain hardware elements of the computing device 102. Execution of the platform-specific firmware 152 can enable the main processor 104 and/or independent processor 106 to make use of certain components of the computing device 102, such as certain storage components, power components, or networking components.

After executing the platform-specific firmware 152, the main processor 104 or the independent processor 106 can identify one or more additional modules to execute based on a module list in the platform-specific firmware 152. The module list can include a selection of modules of a module library 138. A module library 138 can be implemented locally, remotely, or a combination of locally and remotely. When implemented locally, the module library 138 can include only module library component 178. The module library component 178 can be stored in the local storage 108, such as part of the firmware package 116. When implemented remotely, the module library 138 can include only module library component 118, which is stored on a remote storage device 112 (e.g., a firmware server or network addressable storage device). When implemented as a combination of locally and remotely, the module library 138 can include both module library component 178 and module library component 118.

When at least some of the module library 138 is implemented remotely, the main processor 104 or the independent processor 106 can access the remote storage device 112 via a network 110 (e.g., a local area network, a wide area network, a cloud network, or the Internet), using a network interface 180 (e.g., a wired or wireless network interface). When at least some of the module library 138 is implemented remotely, the main processor 104 or the independent processor 106 can search for a module in one location first, before searching in another location. For example, when searching for a given module GUID, module library component 178 can be searched first before the module library component 118 is searched. Other orders as well as preset orders (e.g., orders included within the platform-specific firmware 152) can be used.

As depicted in FIG. 1, the computing environment 100 can include a second computing device 114. Second computing device 114 can be the same as or similar to the computing device 102, except with a different firmware package 120. Components of the second computing device 114 are not depicted solely for illustrative purposes. Firmware package 120 can include a module library component 139 that is identical to the module library component 178. Likewise, in instances where the module library 138 is implemented as a combination of locally and remotely, the module library 138 can be similarly defined as the combination of the module library component 139 and the module library component 118. At least some of the platform-specific firmware 153 for the second computing device 114 is different from the platform-specific firmware 152 of the computing device 102.

In an example, both the computing device 102 and the second computing device 114 can be identical devices with identical hardware. The platform-specific firmware 152, 153 of the computing device 102 and the second computing device 114, respectively, can be nearly identical, with the same code used to initialize components (e.g., hardware) used to read their respective module lists. In this example, only the module lists are different between the platform-specific firmware 152, 153. Thus, when the computing device 102 boots, it will execute firmware associated with the module list in its platform-specific firmware 152, thus executing a specific set of firmware modules from the module library 138 (e.g., from module library component 178). When the second computing device 114 boots, it will execute firmware associated with the module list in its platform-specific firmware 153, thus executing a different set of firmware modules from the module library 138 (e.g., from module library component 139). As a result, computing device 102 and second computing device 114 may have different capabilities, states, or uses from one another.

In some cases, the second computing device 114 is a very different device than the computing device 102. For example, the computing device 102 may be a storage device of a storage area network, whereas second computing device 114 may be an application server. The hardware as well as the specification requirements and applications used in the computing device 102 and the second computing device 114 may be different. Nevertheless, the firmware packages 116, 120 supplied to each device may be nearly identical, with identical module library components 178, 139, but differing platform-specific firmware 152, 153. Because of the differences in the platform-specific firmware 152, 153, the computing device 102 and second computing device 114 are able to properly initialize their respective hardware to read their respective module list, then execute the respective selection of modules from the module library 138. As a result, the computing device 102 can be properly initialized for its use as a storage device of a storage area network, whereas the second computing device 114 can be properly initialized for its use as an application server.

When an update is needed for any module in the module library 138, such an update can be pushed out as a single module, can be included in a new firmware package 116, 120, or can be automatically updated on the remote storage device 112. When a change to the particular modules used or settings used in the firmware of the computing device 102 is desired, the module list or other settings (e.g., configuration parameters) of the platform-specific firmware 152 can be updated.

In some cases, the computing environment 100 can include a management computing device 160. Management computing device 160 can be coupled to network 110 to communicate with the computing device 102 to manage its firmware. Management computing device 160 can be used to make adjustments to the platform-specific firmware 152 (e.g., makes changes to the module list or make changes to the configuration parameters or other settings), can make updates to some or all of the module library component 178, or can entirely replace the firmware package 116. Management computing device 160 can interact with the management controller 158 in computing device 102, although that need not always be the case.

Figure 2:
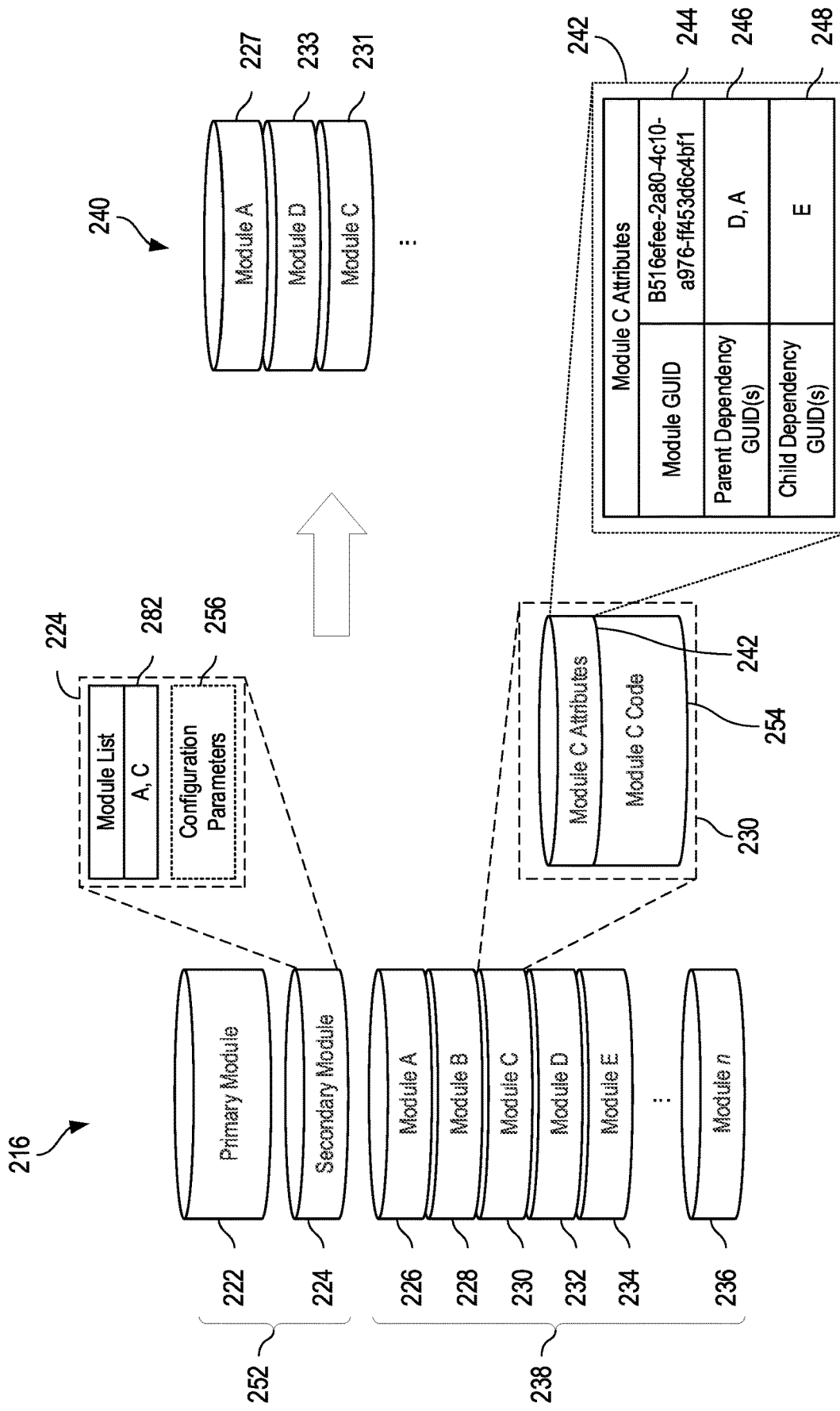
FIG. 2 is a schematic diagram depicting an initial firmware package and an executable firmware bundle, according to certain aspects of the present disclosure.

FIG. 2 is a schematic diagram depicting an initial firmware package 216 and an executable firmware bundle 240, according to certain aspects of the present disclosure. Firmware package 216 can be any suitable firmware package, such as firmware package 116 of FIG. 1. As depicted in FIG. 2, the entire module library 238 is shown as being part of firmware package 216, although that need not always be the case. In other instances, some or all of the module library 238 is located in a remote storage device, such as remote storage device 112 of FIG. 1.

Firmware package 216 includes platform-specific firmware 252 and a module library 238. The platform-specific firmware 252 includes a primary module 222 and a secondary module 224. The primary module 222 includes basic code executable by a processor of the computing device (e.g., main processor 104 or independent processor 106 of computing device 102 of FIG. 1) to initialize certain components (e.g., hardware) thereof that are used to access the secondary module 224, access the module library 238, and/or perform any other tasks necessary to access and execute the specified modules from the module library 238.

Secondary module 224 can include a module list 282 and can optionally include configuration parameters 256. The secondary module 224 can be stored in a writable memory, such as NVRAM, although that need not always be the case.

The module list 282 is a listing of selected modules that are to be used in the boot-up process for the given computing device. In some cases, the module list 282 is complete, although that need not always be the case, as in some cases other dependent modules can be automatically implemented without necessarily being included in the module list 282 itself. As depicted in FIG. 2, the module list 282 identifies "A" and "C" for inclusion in the firmware bundle 240. While depicted as "A" and "C", the module list 282 would include the GUID of the modules to be implemented. For example, instead of using "C" to indicate that Module C 230 is to be implemented, the module list 282 would include the GUID for Module C 230 (e.g., B516efee-2a80-4c10-a976-ff453d6c4bf1, as described in further detail herein). Modules can be organized in other fashions. Additionally, the module list 282 can include additional information, such as alternate modules to use if available (e.g., alternate versions of a given module), comments, and other information.

Configuration parameters 256 can include variables or other settings used during the boot-up process. These parameters can be used in interpreting the module list 282 (e.g., helping identify which version of a given module to use), in composing the firmware bundle 240, or in executing one or more modules 227, 233, 231 of the firmware bundle 240. Configuration parameters 256 can be global parameters that persist through the boot-up process or at least through execution of the firmware bundle 240.

The module library 238 can include any number of modules, depicted in FIG. 2 as Module A 226 through Module n 236. Modules 226, 228, 230, 232, 234, 236 can be stored together, although that need not always be the case. Each of the modules 226, 228, 230, 232, 234, 236 of the module library 238 can be different. In some cases, multiple modules of the module library 238 can perform similar functions (e.g., initializing the same piece of hardware), but in a different way or with a different result. In some cases, multiple modules of the module library 238 can be used to obtain the same result, but can do so in a different way using different hardware.

For illustrative purposes, Module C 230 is described in further detail, although any of the other modules 226, 228, 232, 234, 236 of the module library 238 can include similar elements. Module C 230 can include module attributes 242 and module code 254. The module code 254 is the actual code that is executed as part of the firmware bundle 240. The module attributes 242 can include a module GUID 244 and dependency information, such as parent dependency GUID(s) 246 and child dependency GUID(s) 248. For illustrative purposes, the full GUID (e.g., "B516efee-2a80-4c10-a976-ff453d6c4bf1") is depicted for the module GUID 244, but abbreviated versions of GUIDs (e.g., "D"; "A"; and "E") are depicted in the parent dependency GUID(s) 246 and child dependency GUID(s) 248.

When the firmware bundle 240 is being composed, the module attributes 242 for each of the modules in the module list 282 can be accessed to identify any potential dependency information. Using the dependency information, a determination can be made as to whether or not any additional modules must be used in the firmware bundle 240, as well as the order to be used.

In the example depicted in FIG. 2, the module list 282 in the Secondary Module 224 indicates that Module A 226 and Module C 230 are to be used. When the module attributes 242 for Module C 230 are accessed, it can be seen that Module D 232 and Module A 226 are both listed in the section for the parent dependency GUID(s) 246. Thus, when the firmware bundle 240 is being composed, Module A 226 and Module D 232 are included, and are included before Module C 230. More specifically, since Module A 226 is already included in the module list 282, the dependency information will be used to ensure Module A 226 is included before Module C 230, since it is a parent module for Module C 230. Module D 232, however, is not in the module list 282, so it will be newly included, and included before Module C 230.

In this example, Module E 234 is listed in the section for the child dependency GUID(s) 248 of Module C 230. In some cases, this child module will automatically be included in the firmware bundle 240 at a location after Module C 231, although that need not always be the case. In some cases, this child module (e.g., Module E 234) will only be included in the firmware bundle 240 if the module list 282 also includes the child module (e.g., Module E 234), in which case it will be included after Module C 231.

Whenever a module is added that is not otherwise on the module list 282 (e.g., Module D 232), that module's module attributes 242 will be accessed to determine whether or not there is any dependency information. If there is dependency information, that dependency information will be used to add additional modules and/or fit the given module into the correct order within the firmware bundle 240.

For illustrative purposes, firmware bundle 240 is depicted as a set of modules 227, 223, 231. Firmware bundle 240 is composed from the platform-specific firmware 252 and the module library 238. For illustrative purposes, in the firmware bundle 240 itself, Module A 226 is represented by Module A 227, Module D 232 by Module D 233, and Module C 230 by Module C 231. The modules 227, 233, 231 depicted in FIG. 2 can be i) copies of their respective modules 226, 232, 230; ii) copies of the module code 254 of their respective modules 226, 232, 230; iii) pointers to or GUIDs of their respective modules 226, 232, 230; or iv) points to the module code 254 of their respective modules 226, 232, 230.

Thus, in some cases a firmware bundle 240 can be an actual file containing code that is to be executed during the boot process. In some cases, a firmware bundle 240 can be a file that is a module order indicating which modules to access and execute. In such cases, the firmware bundle 240 can be composed prior to being executed, however that need not always be the case. In some cases, a firmware bundle 240 can be an abstraction representative of the order in which the desired modules are executed, such as if a processor handling the boot process directly executes the modules during the process of composing the firmware bundle 240. In such cases, "composing" the firmware bundle 240 includes sequentially executing each module that is to be executed.

Figure 3:
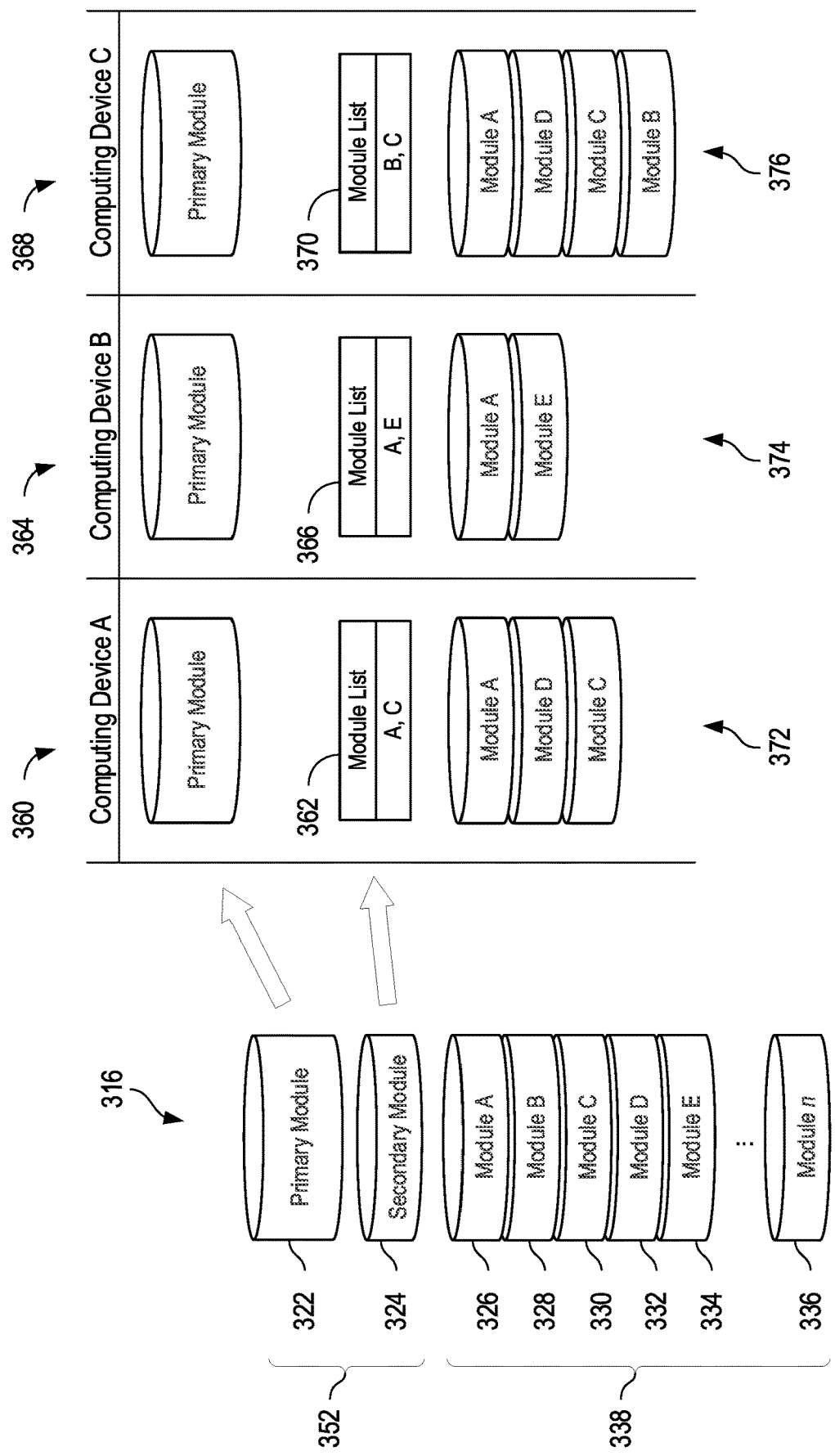
FIG. 3 is a schematic diagram depicting a common module library being used on multiple computing devices, according to certain aspects of the present disclosure.

FIG. 3 is a schematic diagram depicting a common module library 338 being used on multiple computing devices 360, 364, 368, according to certain aspects of the present disclosure. Module library 338 can be any suitable module library, such as module library 238 of FIG. 2. Module library 338 can be part of a firmware package 316, and can be stored with (e.g., contiguously with or otherwise locally with) or remote from platform-specific firmware 352. Module library 338 includes multiple modules, such as modules 326, 328, 330, 332, 334, 336.

In the example of FIG. 3, Computing Device A 360, Computing Device B 364, and Computing Device C 368 each comprise the same hardware, and each have identical copies of the firmware package 316, including identical copies of Primary Module 322, except for differences in their respective secondary modules 324. The secondary module 324 of Computing Device A 360 includes module list 362 indicating Module A 326 and Module C 330; the secondary module 324 of Computing Device B 364 includes module list 366 indicating Module A 326 and Module E 334; and the secondary module 324 of Computing Device C 368 includes module list 370 indicating Module B 328 and Module C 330.

During the boot-up process of Computing Device A 360, its copy of Primary Module 322 will be executed, then its module list 362 will be accessed. The module list 362 indicates Module A 326 and Module C 330. Thus, like the firmware bundle 240 composed from the module list 282 of FIG. 2, firmware bundle 372 will be composed from module list 362. Firmware bundle 372 includes Module A 326, Module D 332, and Module C 330. While not on the module list 362, Module D 332 is added because it is a parent dependent module for Module C 330. Likewise, since Module A 326 and Module D 332 are both parent dependent modules for Module C 330, they both occur before Module C 330 in the firmware bundle 372. Computing Device A 360 executes each module of the firmware bundle 372 to finish its boot-up process.

During the boot-up process of Computing Device B 364, its copy of Primary Module 322 will be executed, then its module list 366 will be accessed. The module list 366 indicates Module A 326 and Module E 334. Thus, firmware bundle 374 will be composed to include Module A 326 and Module E 334. In this example, neither Module A 326 nor Module E 334 include any module dependencies. Computing Device B 364 executes each module of the firmware bundle 374 to finish its boot-up process.

During the boot-up process of Computing Device C 368, its copy of Primary Module 322 will be executed, and then its module list 370 will be accessed. The module list 370 indicates Module B 328 and Module C 330. Thus, firmware bundle 376 will be composed to include Module B 328 and Module C 330. In this example, since Module A 326 and Module D 332 are parent dependencies for Module C 330, they are also included in the composition of firmware bundle 376. Further, in this example, Module B 328 is a child dependency for Module D 332. Thus, since Module D 332 and Module B 328 are included in the firmware bundle 376, Module B 328 is included after Module D 332. Computing Device C 368 executes each module of the firmware bundle 376 to finish its boot-up process.

As a result of small changes in the respective module lists 362, 366, 370 of the secondary modules 324 for each of Computing Device A 360, Computing Device B 364, and Computing Device C 368, each of these computing devices has been booted using different firmware modules. While traditional techniques would require a new firmware image to be generated for each of these computing devices 360, 364, 368; certain aspects of the present disclosure permit a single firmware package 316 to be used for all computing devices 360, 364, 368, with only small changes in the easily writable secondary module 324.

Additionally, if Module A 326 is to be updated (e.g., to fix a bug or implement a new feature), the user can update Module A 326 once, then provide the update to each of the computing devices 360, 364, 368 to update the locally-stored Module A 326 of their module library 338, or provide the update to a remote storage device to update the remotely-stored Module A 326 of the module library 338.

Additionally, while described in a first example as different computing devices with the same hardware, in a second example, Computing Device A 360, Computing Device B 364, and Computing Device C 368 can be different instances of a single computing device at different times (e.g., at a first time, second time, and third time, respectively). In such an example, Computing Device B 364 can be Computing Device A 360 after updating the module list 362 to module list 366 by removing Module C 330 and adding Module E 334. In such an example, when the computing device boots at the first time using module list 362, it will boot using firmware bundle 472. However, after updating module list 362 to module list 366, that same computing device can boot at the second time using firmware bundle 474. Thus, a single computing device can be booted with two different sets of firmware code simply by making changes to the Secondary Module 324.

Each of the modules 326, 328, 330, 332, 334, 336 can represent units of code that can be executed by a computing device during a boot-up process. In an example, certain modules can represent code used to implement system management specifications or protocols, such as the Redfish standard. In this example, Module C may represent Redfish version 1.5 while Module E may represent Redfish version 1.1. Thus, minor differences in the respective module lists 362, 366 can cause Computing Device A 360 and Computing Device B 364 to be booted with different firmware bundles 372, 374, leading to different implementations of the Redfish standard. In some cases, a single module list may list Module C 330 as a preferred alternative to Module E 334. In such cases, Module C 330 would be used, if possible, but if Module C 330 is unavailable or otherwise unusable, Module E 334 can be used instead.

In some cases, Computing Device A 360, Computing Device B 364, and Computing Device C 368 may include different hardware. In such cases, their respective firmware bundle 372, 374, 376 can be used to initialize the different hardware components. In some cases, however, different hardware may be used to access the Secondary Module 324, access the module library 338, or execute their respective firmware bundles 372, 374, 376. In such cases, each of Computing Device A 360, Computing Device B 364, and Computing Device C 368 may make use of a different Primary Module, rather than using the same Primary Module 322. Therefore, the different code in their respective Primary Modules can be used to initialize their appropriate hardware components.

Figure 4:
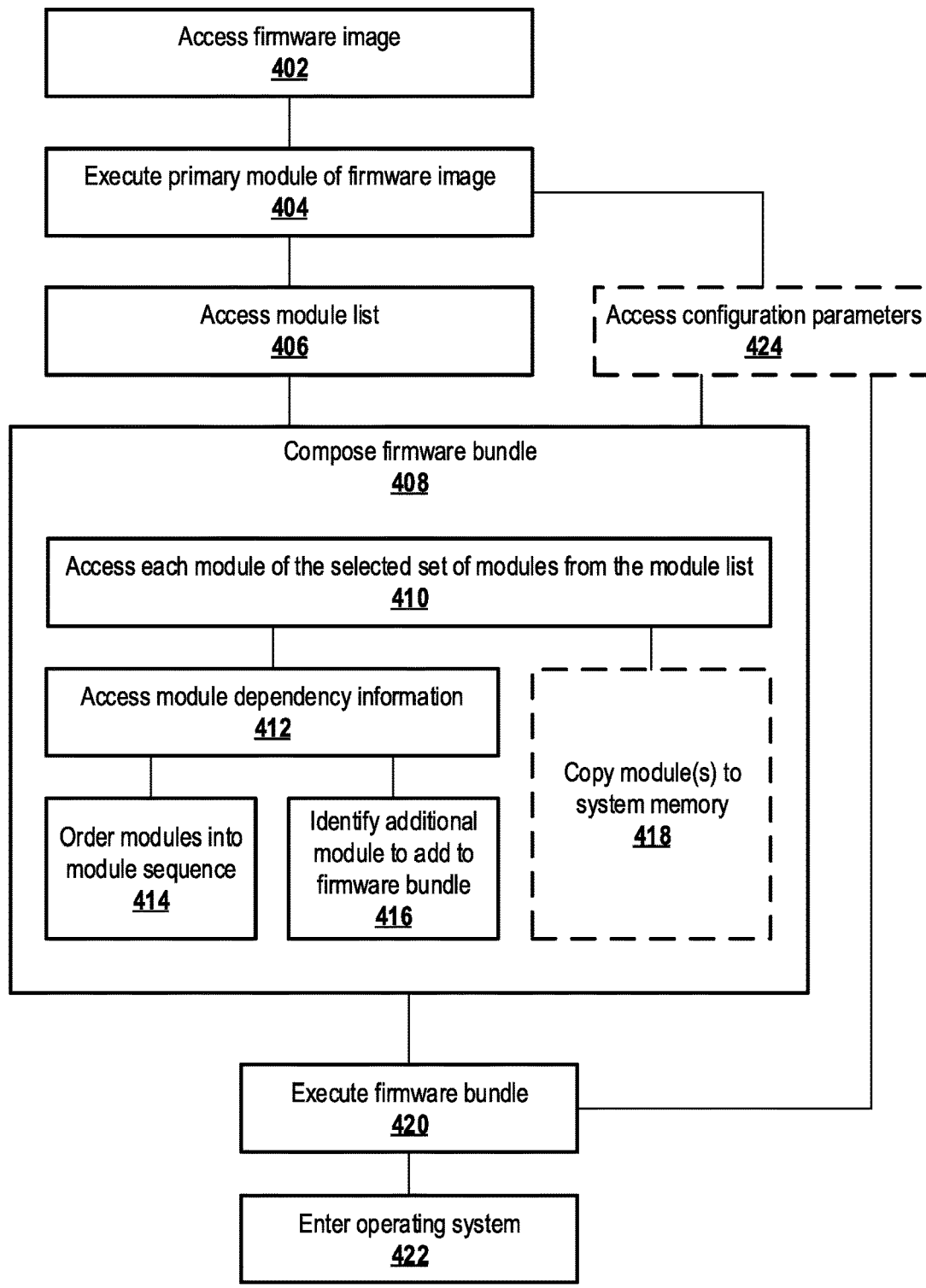
FIG. 4 is a flowchart depicting a process for modularly composing firmware on multiple computing devices, according to certain aspects of the present disclosure.

FIG. 4 is a flowchart depicting a process 400 for modularly composing firmware, according to certain aspects of the present disclosure. Process 400 can be performed on any suitable computing device, such as computing device 102 of FIG. 1.

At block 402, a firmware image can be accessed. Accessing the firmware image can include accessing local memory containing the firmware image. Accessing the firmware image can include supplying power to the computing device to cause a processor of the computing device (e.g., the main processor or an independent processor) to access and begin executing the firmware image.

At block 404, the primary module of the firmware image is executed. Executing the primary module can include initializing at least one hardware component of the computing device. The at least one hardware component can be a component used to perform one or more of blocks 406, 408, and 410, as described in further detail below. For example, in cases where performance of block 408 requires use of a network interface, execution of the primary module at block 404 can include initialization of the network interface.

At block 406, a module list can be accessed. The module list can indicate a selected set of modules that are to be used in booting up the computing device performing process 400. The module list accessed in block 406 can be user-modifiable, such as via a text editor or a management interface. In some cases, the module list at block 406 can include one or more preferred alternate modules associated with a given module, although that need not always be the case. In some cases, the module list can be stored in a Secondary Module of the firmware image accessed at block 402, although this need not always be the case.

At optional block 424, configuration parameters can be accessed. Configuration parameters can be platform-specific and/or user-modifiable parameters that are used during process 400, such as during composition of a firmware bundle at block 408 and/or during execution of one or more modules during block 420, as described in further detail below.

At block 408, a firmware bundle can be composed. The firmware bundle is a list of modules, a set of modules, or a representation of modules that are to be executed during the boot of the computing device performing process 400. The firmware bundle is based on the module list accessed at block 406. Composing the firmware bundle at block 408 can include iteratively stepping through each module of the selected set of modules identified in the module list. In cases where preferred alternate modules are indicated for a given module, the given module may be skipped if the preferred alternate module is identified and used.

For each module of the selected set of modules identified in the module list from block 406, composing the firmware bundle at block 408 can include accessing the module from a module library at block 410. Accessing the module at block 410 can include locating the module in the module library, such as using the module's GUID. In some cases, accessing the module at block 410 can include accessing a module library component stored on local storage within the computing device performing process 400. In some cases, accessing the module at block 410 can include accessing a module library component stored on a remote storage device accessible via a network interface of the computing device performing process 400.

In some cases, composing the firmware bundle at block 408 includes accessing module dependency information for a given module (e.g., each of the modules accessed at block 410) at block 412. Each module can include module dependency information, which is indicative of a chain of dependency or dependency relationship(s) between the given module and one or more other modules. Accessing the module dependency information can include accessing parent dependency information (e.g., one or more parent dependency GUIDs) and/or accessing child dependency information (e.g., one or more child dependency GUIDs).

In some cases, the dependency information can be used at block 414 to order the modules of the module list (e.g., the selected set of modules) into a module sequence. Ordering the modules into the module sequence can include ordering the modules such that each module occurs in the module sequence after any of its parent dependency modules and before any of its child dependency modules. Thus, when the firmware bundle is executed at block 420, any parent dependency module will be executed before execution of a module requiring the parent dependency module.

In some cases, module dependency information can be used at block 416 to identify additional modules to add to the firmware bundle. In some cases, a parent dependency module or a child dependency module can be indicated as optional or required, although that need not always be the case. In some cases, any parent dependency module or child dependency module that is listed can be assumed to be required. When a required dependency module (e.g., parent dependency module or child dependency module) is listed for a given module in that module's dependency information, but the required dependency module is not listed in the selected set of module from the module list, composing the firmware bundle at block 408 can include adding that required dependency module to the firmware bundle 416 (e.g., adding the required dependency module in the correct order in the module sequence, such as with reference to block 414). Adding a required dependency module can include performing all aspects of block 408 on that module as if it were originally included in the module list, such as performing blocks 410, 412, 414, and 416 with respect to that module.

In some cases, such as when a single processor (e.g., a main processor) is used to perform process 400, the firmware bundle composed at block 408 can be in the form of a module sequence or a collection of modules. This firmware bundle can be executed at block 420. Execution of the firmware bundle can include executing each of the modules of the firmware bundle composed at block 408, which include each of the selected set of modules from the module list of block 406 and any additional modules that were added at block 416.

In some cases, such as when multiple processors are used to perform process 400, composing the firmware bundle at block 408 can include copying the given module(s) to system memory at block 418. In such cases, certain aspects of process 400 can be executed by an independent processor, leaving execution of the firmware bundle at block 420 to the main processor. In such cases, composing the firmware bundle at block 408 can be performed by the independent processor, and can include copying the given module(s) to system memory at block 418. Copying the given module(s) can include copying each module that to be executed as part of the firmware bundle at block 408, which includes each of the selected set of modules from the module list of block 406 and any additional modules that were added at block 416. In some cases, copying the module(s) can include copying the modules in a module sequence order using the module sequence of block 414. In some cases, the module sequence of block 414 can be separately stored in a table accessible by the main processor (e.g., stored in in system memory). In some cases, copying module(s) to system memory at block 418 can include storing memory settings in a table accessible by the main processor (e.g., the table containing the module sequence or another table stored in system memory).

When multiple processors are used, the independent processor can pass off control to the main processor after composing the firmware bundle at block 408. The main processor can then execute the firmware bundle at block 420. In such cases, executing the firmware bundle can include accessing the firmware bundle stored in system memory. In some cases, the main processor can further access other information, such as the table(s) containing the module sequence and/or memory settings, which can be used by the main processor in the accessing and execution of the firmware bundle.

In cases where configuration parameters are accessed at block 424, the configuration parameters can be passed to one or more (e.g., one, some, or all) of the modules being executed at block 420 during execution of the given module.

After the firmware bundle has been executed at block 420, the computing device can optionally enter an operating system at block 422. In some cases, modules executed at block 420 can facilitate or trigger loading the operating system.

While depicted in a particular order, in some cases blocks of process 400 can occur in different orders, optionally including additional blocks and/or fewer blocks. In an example, in some cases when an independent processor is used, accessing the module list at block 406 and composing the firmware bundle at block 408 can occur prior to execution of the primary module at block 404. In such cases, when the independent processor has finished copying each module of the selected set of modules to system memory at block 418, the independent processor can hand over control to the main processor, which can then execute the primary module at block 404 before executing the firmware bundle at block 420.

Figure 5:
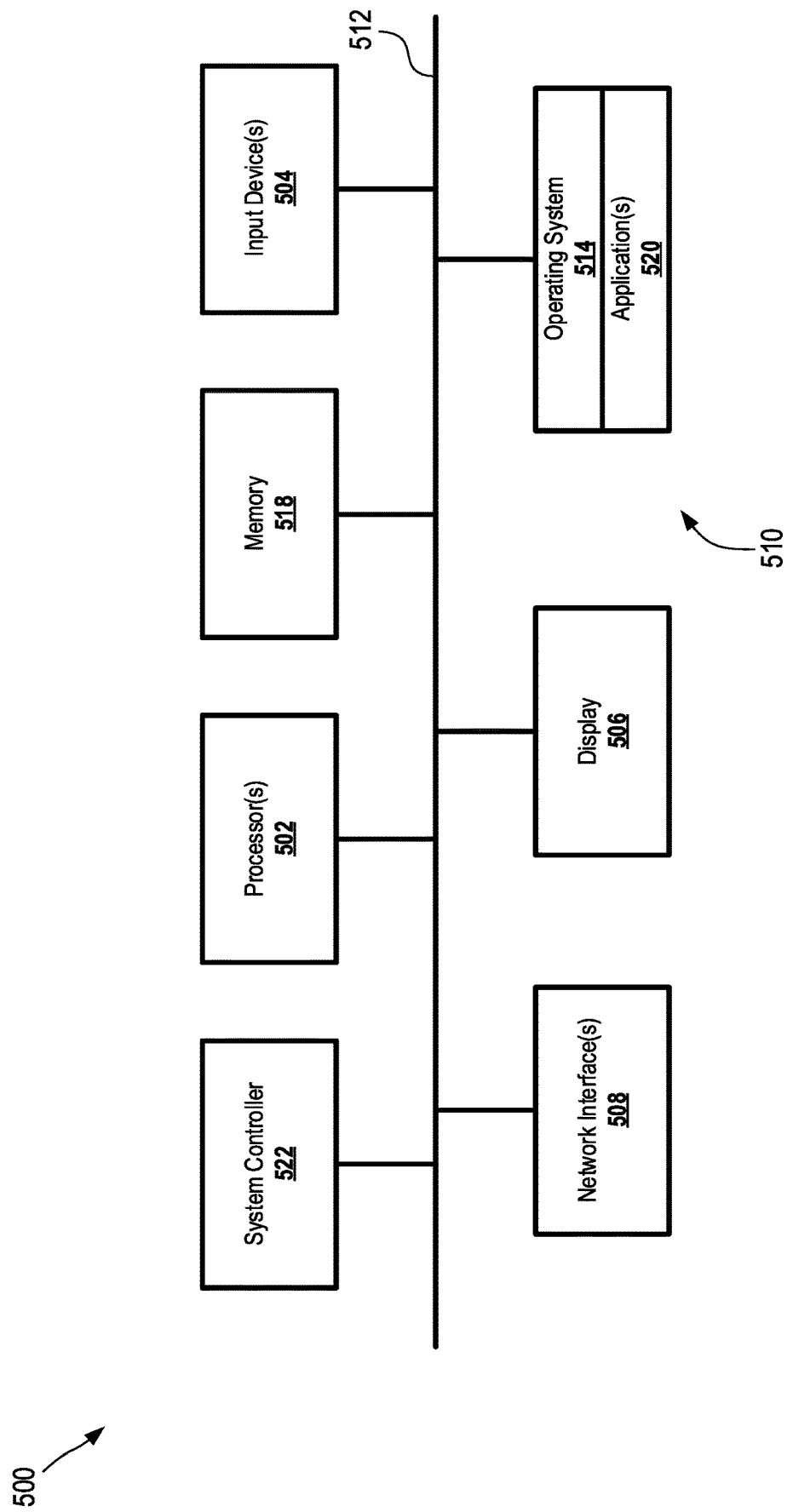
FIG. 5 is a block diagram of an example system architecture for implementing certain aspects and features of the present disclosure.

FIG. 5 is a block diagram of an example system architecture 500 for implementing certain features and processes of the present disclosure, such as those presented with reference to process 400 of FIG. 4. The system architecture 500 can be used to implement a server, a user device, a computing device (e.g., computing device 102, second computing device 114, remote storage device 112, or management computing device 160 of FIG. 1), or any other suitable device for performing some or all of the aspects of the present disclosure. The system architecture 500 can be implemented on any electronic device that runs software applications derived from compiled instructions including, without limitation, personal computers, servers, smart phones, electronic tablets, game consoles, email devices, and the like. In some implementations, the system architecture 500 can include one or more processors 502 (e.g., a main processor and optionally an independent processor), one or more input devices 504, one or more display devices 506, one or more network interfaces 508, and one or more computer-readable mediums 510. Each of these components can be coupled by bus 512.

Display device 506 can be any known display technology, including but not limited to, display devices using Liquid Crystal Display (LCD) or Light Emitting Diode (LED) technology. Processor(s) 502 can use any known processor technology including but not limited to, graphics processors and multi-core processors. Input device 504 can be any known input device technology including but not limited to, a keyboard (including a virtual keyboard), a mouse, a track ball, and a touch-sensitive pad, or a display. In some cases, audio inputs can be used to provide audio signals, such as audio signals of an individual speaking. Bus 512 can be any known internal or external bus technology including but not limited to, ISA, EISA, PCI, PCI Express, NuBus, USB, Serial ATA, or FireWire.

Computer-readable medium 510 can be any medium that participates in providing instructions to processor(s) 502 for execution, including without limitation, non-volatile storage media (e.g., optical disks, magnetic disks, flash drives, etc.) or volatile media (e.g., SDRAM, ROM, etc.). The computer-readable medium 510 (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Computer-readable medium 510 can include various instructions for implementing operating system 514 and applications 520 such as computer programs. The operating system 514 can be multi-user, multiprocessing, multitasking, multithreading, real-time, and the like. The operating system 514 performs basic tasks including but not limited to: recognizing input from input device 504; sending output to display device 506; keeping track of files and directories on computer-readable medium 510; controlling peripheral devices (e.g., storage drives, interface devices, etc.) which can be controlled directly or through an I/O controller; and managing traffic on bus 512. Computer-readable medium 510 can include various instructions for implementing firmware processes, such as a BIOS. In some cases, computer-readable medium 510 can include firmware packages, including a Primary Module, a Secondary Module, and any number of add-on modules in a module library (e.g., Primary Module 222, Secondary Module 224, and module library 238 of FIG. 2). Computer-readable medium 510 can include various instructions for implementing any of the processes described herein including but not limited to, at least process 400 of FIG. 4.

Memory 518 can include high-speed random access memory and/or non-volatile memory, such as one or more magnetic disk storage devices, one or more optical storage devices, and/or flash memory (e.g., NAND, NOR). The memory 518 (e.g., computer-readable storage devices, mediums, and memories) can include a cable or wireless signal containing a bit stream and the like. However, when mentioned, non-transitory computer-readable storage media expressly exclude media such as energy, carrier signals, electromagnetic waves, and signals per se. The memory 518 can store an operating system, such as Darwin, RTXC, LINUX, UNIX, OS X, WINDOWS, or an embedded operating system such as VxWorks. In some cases, aspects of a firmware package according to certain aspects of the present disclosure can be stored in the memory 518.

System controller 522 can be a service processor that operates independently of processor 502. In some implementations, system controller 522 can be a baseboard management controller (BMC).

Certain aspects and features of the present disclosure can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computing device to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computing device. Generally, a processor will receive instructions and data from a read-only memory or a random access memory or both. The essential elements of a computing device are a processor for executing instructions and one or more memories for storing instructions and data. Generally, a computing device will also include, or be operatively coupled to communicate with, one or more mass storage devices for storing data files. Such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computing device having a display device such as a CRT (cathode ray tube) or LCD (liquid crystal display) monitor for displaying information to the user and a keyboard and a pointing device such as a mouse or a trackball by which the user can provide input to the computing device.

Certain aspects of the present disclosure can be implemented in a computing system that includes a back-end component, such as a data server, or that includes a middleware component, such as an application server or an Internet server, or that includes a front-end component, such as a client computing device having a graphical user interface or an Internet browser, or any combination thereof. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an application programming interface (API). An API can define one or more parameters that are passed between a calling application and other software code (e.g., an operating system, library routine, function) that provides a service, provides data, or performs an operation or a computation. The API can be implemented as one or more calls in a program code that sends or receives one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API. In some implementations, an API call can report to an application the capabilities of a device running the application, such as input capability, output capability, processing capability, power capability, communications capability, and the like.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art. Numerous changes to the disclosed embodiments can be made in accordance with the disclosure herein, without departing from the spirit or scope of the invention. Thus, the breadth and scope of the present invention should not be limited by any of the above described embodiments.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A computer-implemented method comprising:
   accessing a firmware image from local storage of a computing device during each boot up of the computing device, the firmware image being a single file including a primary module, a module list, and a module library, the computing device including a main processor and an independent platform security processor;
   executing, by the independent platform security processor, the primary module, wherein executing the primary module includes initializing one or more hardware resources of the computing device;
   accessing, by the independent platform security processor during each boot up of the computing device, the module list associated with the firmware image, wherein the module list includes unique identification information associated with a selected set of modules of the module library, wherein the module library includes a plurality of executable modules that includes the selected set of modules and one or more non-selected modules, the selected set of modules and the one or more non-selected modules being part of the single file of the firmware image;
   composing, by the independent platform security processor, a firmware bundle based on the selected set of modules during each boot up of the computing device, wherein composing the firmware bundle includes accessing each module of the selected set of modules;
   accessing, by the independent platform security processor, configuration parameters from the firmware image and storing the configuration parameters in system memory, the configuration parameters including an indication of a module firmware version to use;
   storing, by the independent platform security processor, a module sequence in the system memory, wherein the module sequence is indicative of an order for executing the modules of the firmware bundle; and
   executing, by the main processor, the firmware bundle and booting up the computing device, wherein executing the firmware bundle further includes executing each module of the firmware bundle in the order indicated by the module sequence, and wherein executing the firmware bundle includes using the configuration parameters to select one out of a plurality of available versions for at least one of the modules of the firmware bundle.

2. The method of claim 1, wherein composing the firmware bundle further includes:
   accessing dependency information associated at least one module of the selected set of modules;
   identifying an additional module using the dependency information, wherein the additional module is not included in the selected set of modules; and
   adding the additional module to the firmware bundle.

3. The method of claim 1, wherein composing the firmware bundle further includes:
   accessing dependency information associated with at least one module of the selected set of modules, wherein the dependency information identifies a parent module and a child module; and
   generating the module sequence using the dependency information, wherein generating the module sequence includes positioning the parent module before the child module in the module sequence.

4. The method of claim 1, wherein accessing each module of the selected set of modules includes accessing at least one module of the selected set of modules from a remote storage via a network interface.

5. The method of claim 1, wherein composing the firmware bundle further includes copying each module of the selected set of modules into system memory accessible by the main processor, and wherein executing the firmware bundle includes accessing the firmware bundle from the system memory.

6. The method of claim 1, wherein the configuration parameters include a selection of one of at least two versions of a module in the list, and wherein executing the firmware bundle includes passing the configuration parameters to at least one of the selected set of modules to be used during execution of the at least one of the selected set of modules.

7. The method of claim 1, wherein accessing the firmware image, executing the primary module, accessing the module list, composing the firmware bundle, and executing the firmware bundle occur prior to initializing an operating system of the computing device.

8. The method of claim 1, further comprising:
   updating the module list to generate an updated module list having an updated selected set of modules, wherein the updated selected set of modules is different from the selected set of modules;
   restarting the computing device;
   composing an updated firmware bundle based on the updated selected set of modules; and
   executing the updated firmware bundle.

9. The method of claim 1, wherein the computing device includes the one or more hardware resources and one or more additional hardware resources, and wherein executing the firmware bundle includes initializing the one or more additional hardware resources.

10. The method of claim 1, wherein
the configuration parameters include a global parameter; and
wherein executing the firmware bundle includes passing the global parameter to at least two of the modules of the firmware bundle to be used during execution of each of the at least two of the modules of the firmware bundle.

11. The method of claim 1, further comprising releasing, by the independent platform security processor, control to the main processor, wherein executing the firmware bundle by the main processor occurs in response to releasing control to the main processor.

12. A computer-program product tangibly embodied in one or more non-transitory machine-readable storage media, including instructions configured to cause the platform independent security processor and the main processor to perform the method of claim 1.

13. A computing device, comprising:
a first hardware device and a second hardware device;
a main processor;
an independent platform security processor;
one or more non-transitory computer-readable storage media containing first instructions and second instructions,
wherein the first instructions, when executed on the independent platform security processor, cause the independent platform security processor to perform first operations including:
accessing a firmware image from local storage during each boot up of the computing device, the firmware image being a single file including a primary module, a module list, and a module library;
executing the primary module, wherein executing the primary module includes initializing the first hardware device;
accessing, during each boot up of the computing device the module list associated with the firmware image, wherein the module list includes unique identification information associated with a selected set of modules of the module library, wherein the module library includes a plurality of executable modules that includes the selected set of modules and one or more non-selected modules, the selected set of modules and the one or more non-selected modules being part of the single file of the firmware image;
composing a firmware bundle based on the selected set of modules during each boot up of the computing device, wherein composing the firmware bundle includes accessing each module of the selected set of modules;
accessing configuration parameters from the firmware image and storing the configuration parameters in system memory, the configuration parameters including an indication of a module firmware version to use;
storing a module sequence in the system memory, wherein the module sequence is indicative of an order for executing the modules of the firmware bundle; and
wherein the second instructions, when executed on the main processor, cause the main processor to perform second operations including:
executing the firmware bundle, wherein executing the firmware bundle includes initializing the second hardware device, wherein executing the firmware bundle further includes executing each module of the firmware bundle in the order indicated by the module sequence, and wherein executing the firmware bundle includes using the configuration parameters to select one out of a plurality of available versions for at least one of the modules of the firmware bundle.

14. The computing device of claim 13, wherein the firmware image is stored in the one or more non-transitory computer-readable storage media.

15. The computing device of claim 13, wherein composing the firmware bundle further includes:
accessing dependency information associated at least one module of the selected set of modules, wherein the dependency information identifies a parent module and a child module;
identifying an additional module using the dependency information, wherein the additional module is not included in the selected set of modules; and
generating the module sequence using the dependency information, wherein generating the module sequence includes positioning the parent module before the child module in the module sequence, wherein generating the module sequence includes adding the additional module in the module sequence.

16. The computing device of claim 13, wherein composing the firmware bundle further includes copying each module of the selected set of modules into system memory accessible by the main processor, and wherein executing the firmware bundle includes accessing the firmware bundle from the system memory.

17. The computing device of claim 13, wherein
the configuration parameters include a global parameter; and
wherein executing the firmware bundle includes passing the global parameter to at least two of the modules of the firmware bundle to be used during execution of each of the at least two of the modules of the firmware bundle.

18. The computing device of claim 13, wherein the first operations further include releasing, by the independent platform security processor, control to the main processor, wherein executing the firmware bundle by the main processor occurs in response to releasing control to the main processor.

* * * * *